(No Model.)

H. A. GUILD.
REEL.

No. 569,128. Patented Oct. 6, 1896.

Witnesses
H. H. Mills,
A. S. Diven

Inventor
Hiram A. Guild
by Eugene Diven
Attorney

THE NORRIS PETERS CO., PHOTO-LITHO., WASHINGTON, D. C.

ated October 6, 1896.

UNITED STATES PATENT OFFICE.

HIRAM A. GUILD, OF KNOXVILLE, PENNSYLVANIA.

REEL.

SPECIFICATION forming part of Letters Patent No. 569,128, dated October 6, 1896.

Application filed May 27, 1896. Serial No. 593,238. (No model.)

*To all whom it may concern:*

Be it known that I, HIRAM A. GUILD, a citizen of the United States, residing at Knoxville, in the county of Tioga and State of Pennsylvania, have invented certain new and useful Improvements in Reels, of which the following is a specification.

My invention relates, primarily, to improvements in chalk-line reels, but is adapted as well to reels for fishing purposes; and the objects of my improvements are, first, to provide the drum or spool of the reel with locking devices whereby after any desired length of line has been run out the drum may be effectually prevented from turning, and yet be instantly released to allow for a further paying out of the line when desired, and, second, to provide means for winding in the line at any time when the lock is set. I attain these objects by the mechanism illustrated in the accompanying drawings, in which—

Figure 1:
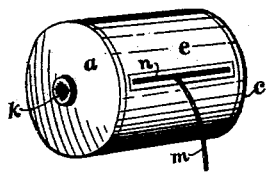
Figure 2:
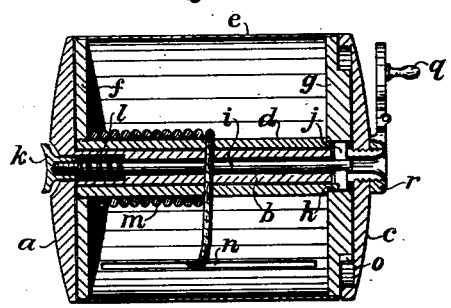
Figure 3:
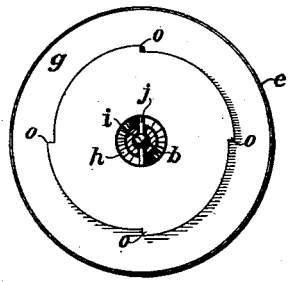
Figure 5:
Figure 4:
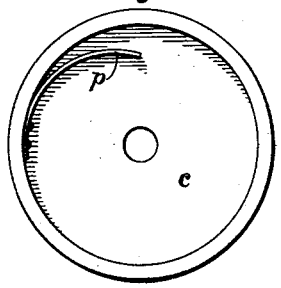

Figure 1 is a view in perspective of the exterior of the reel; Fig. 2, a longitudinal section of the reel; Fig. 3, an end view with the cap $c$ removed; Fig. 4, a view of the inside of cap $c$; Fig. 5, a side view of the drum $d$ detached, showing the locking-teeth; and Fig. 6, a modification of the same.

Similar letters refer to similar parts throughout the several views.

$a$ is a cap or end piece, fastened to which is the hollow spindle $b$, the end of which is screw-threaded to receive a second cap $c$. Upon the spindle $b$ is a drum $d$, adapted to turn freely thereon, and upon the drum $d$ is loosely mounted a cylindrical shell $e$, provided with the heads $f$ and $g$, which are journaled upon the ends of the drum. The hole in the head $g$ is smaller than that in the head $f$, and the drum is reduced at $h$ to fit into this hole, the shoulder thus formed on the drum and the cap $a$ preventing end motion of the drum when the parts are fitted together.

Within the hollow spindle is a rod $i$, provided at one end with a cross-bar $j$, which projects out on either side of the spindle through slits provided therefor and engages teeth cut on the end of the reduced portion $h$ of the drum $d$, as shown more clearly in Fig. 5. The other end of rod $i$ is threaded and has a push-button $k$ attached thereto, a spring $l$ being located in a counterbore in the spindle to press outward upon the push-button. The bar $j$ is thus always kept in engagement with the teeth on $h$, except when the push-button is pressed in by the thumb or finger, the head of the push-button being concaved to form a good hold therefor, and the drum is held locked to the spindle. The line $m$ is so wound upon the drum that when it is pulled outward the turning of the drum will be prevented by the teeth on $h$ engaging the bar $j$. The line $m$ passes out from the shell $e$ through the slit $n$, which is long to allow the line to be wound back and forth upon the drum.

As the drum is free to turn within the shell $e$, some means must be provided to lock the drum and shell together. Otherwise, when the reel is held by the line only, the drum, spindle, and caps $a\ c$ will turn and the line run out. By providing the head $g$ with ratchet-teeth $o$, disposed in opposition to the teeth on $h$, and a spring-pawl $p$ in the recessed portion of cap $c$, the cap $c$, and through it the spindle, and the drum when locked to the spindle, are locked to the shell to prevent the running out of the line.

In operation, when it is desired to let out the line the push-button is pressed in. This releases the drum and allows it to turn freely, when the line may be run out to any desired length, after which further paying out of the line is stopped by simply releasing the push-button. When it is desired to wind in the line, in my simplest construction one of the caps $a\ c$ is grasped in one hand and the line wound around by the other, as in winding a line upon an ordinary spool, the shell $e$ being allowed by its ratchet connection to turn in the proper direction, the caps $a\ c$, the spindle, and the drum remaining stationary.

In Fig. 2 I have shown a crank for use in winding in the line, if it should be desired. When the crank is used, the shell is held in one hand and the crank turned by the other. In this arrangement the caps $a\ c$, the spindle, and the drum are turned and the shell remains stationary. I have shown a crank of the hinged type common upon tape-line reels, the crank-handle $q$ being adapted to turn into the open end of the hollow spindle and the hub $r$ of the crank forming a jam-nut to fasten the cap $c$ securely upon the spindle. The crank-handle might be fastened directly to the cap c; but the hinged form is more desirable, since it allows the handle to be turned in out of the way while the reel is being carried about and not in use. Where the reel is made without the crank, or where the crank-handle is attached to one of the caps, I propose to attach a small cap to the end of the spindle to cover the open slotted end and at the same time act as a jam-nut, or I may form this cap in one piece with the cap c.

Figure 6:
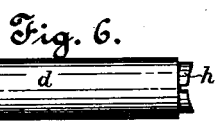

In Fig. 6 I have shown a modified form of the teeth on the end of drum d. In this case the bar j slips into notches, and the drum is held from turning in either direction upon the spindle.

For chalk-line purposes I prefer the form without the crank, as this is the cheapest and brings the reel within the limits of any carpenter's purse. The advantages of the reel for this purpose are apparent. It does away with the hitch around the spool and the time consumed in untying the knots so made, the inclosing shell protects the line from wet, and, finally, there is no danger of the line becoming unwound and tangled up with the rest of the carpenter's kit.

For fish-line purposes the cylindrical shell e would be replaced by bars for holding the heads f and g the required distance apart, two bars being set close together to form the slit n, and the reel attached to the rod in the usual manner. While fishing, the rod would be held in one hand, so that the push-button could be manipulated by the thumb, the other hand being left free to operate the crank to wind in the line. In this way the line can be paid out, held tight, or wound in at the pleasure of the fisherman.

I am aware that reels have been made prior to my invention in which the spool or drum is free to turn in the reel-frame, with various means for locking the spool and for turning it to wind in the line, and I do not claim these things broadly.

What I claim as my invention, and desire to secure by Letters Patent, is—

1. A reel composed of two end pieces or caps, a drum or spool to which a line is attached between the caps, a shell having a guide-opening for the line surrounding the drum between the caps and adapted to rotate when the line is being wound upon the drum, and means for locking the shell against rotation in a direction opposite that in which the line is wound upon the drum.

2. In a reel, the combination of a spindle joining the end pieces or caps of the reel, a drum or spool to which the line is attached loosely mounted upon the spindle, a cylindrical shell provided with heads loosely mounted upon the drum, a slit in the shell through which the line passes, a pawl-and-ratchet connection between one of the heads and one of the caps, and means for locking the drum to the spindle, substantially as described.

3. In a reel, the combination of a spindle joining the end pieces or caps of the reel, a drum or spool to which the line is attached loosely mounted upon the spindle, a shell provided with heads loosely mounted upon the drum, a guide-opening for the line through the shell, and means for locking the drum and the shell to the spindle to prevent the line from running out, substantially as described.

In testimony whereof I have affixed my signature in presence of two witnesses.

HIRAM A. GUILD.

Witnesses:
 EUGENE DIVEN,
 HOLLIS H. MILLS.